United States Patent
Brady et al.

(10) Patent No.: US 10,400,941 B2
(45) Date of Patent: Sep. 3, 2019

(54) TRIPOD LEG

(71) Applicant: THE VITEC GROUP Plc, Richmond (GB)

(72) Inventors: James Brady, Suffolk (GB); Jolyon Torbitt, Suffolk (GB); James Guest, Suffolk (GB)

(73) Assignee: THE VITEC GROUP PLC, Richmond (GB)

( * ) Notice: Subject to any disclaimer, the term of this patent is extended or adjusted under 35 U.S.C. 154(b) by 0 days.

(21) Appl. No.: 15/561,354

(22) PCT Filed: Mar. 1, 2016

(86) PCT No.: PCT/GB2016/050534
§ 371 (c)(1),
(2) Date: Sep. 25, 2017

(87) PCT Pub. No.: WO2016/156784
PCT Pub. Date: Oct. 6, 2016

(65) Prior Publication Data
US 2018/0252354 A1    Sep. 6, 2018

(30) Foreign Application Priority Data
Mar. 27, 2015   (GB) .................................. 1505327.5

(51) Int. Cl.
*F16M 11/32*         (2006.01)
*F16B 2/18*          (2006.01)
*G03B 17/56*         (2006.01)

(52) U.S. Cl.
CPC ............. *F16M 11/32* (2013.01); *F16B 2/185* (2013.01); *G03B 17/561* (2013.01)

(58) Field of Classification Search
CPC . F16M 11/32; F16B 7/10; F16B 7/105; F16B 7/1454
USPC .... 248/688, 463, 163.1, 166, 434, 435, 168, 248/169, 170, 171, 439, 177.1, 186.1, 248/186.2, 188.1, 188.6, 188.7, 188.8, 248/354.1, 80
See application file for complete search history.

(56) References Cited

U.S. PATENT DOCUMENTS

| | | | | | |
|---|---|---|---|---|---|
| 413,118 | A | * | 10/1889 | Warner | ................ A47B 13/021 248/188 |
| 663,535 | A | * | 12/1900 | Essner et al. | .......... F16M 11/16 248/177.1 |
| 2,282,285 | A | * | 5/1942 | Olson | .................. F16M 11/046 16/24 |
| 3,404,859 | A | * | 10/1968 | Chapman | ................. G01C 5/00 248/184.1 |

(Continued)

FOREIGN PATENT DOCUMENTS

| AU | 763875 B2 | 7/2003 |
|---|---|---|
| DE | 3043043 A1 | 5/1981 |

(Continued)

*Primary Examiner* — Terrell L McKinnon
*Assistant Examiner* — Michael McDuffie
(74) *Attorney, Agent, or Firm* — Pepper Hamilton LLP

(57) ABSTRACT

A tripod leg (3) comprises a lever wherein said lever (13) is arranged on a portion of said leg (3), which in use, does not move in relation to an attached tripod head element (2); characterized in that said lever (13) further comprises an aperture (15) which is sized to cooperate with one or more digits of a user's hand.

8 Claims, 3 Drawing Sheets

(56) References Cited

U.S. PATENT DOCUMENTS

| | | | |
|---|---|---|---|
| 4,324,477 A | 4/1982 | Miyazaki | |
| 4,695,021 A | 9/1987 | Leinfelder | |
| 4,872,627 A * | 10/1989 | O'Connor | F16B 7/105 248/168 |
| 5,887,835 A * | 3/1999 | Hein | F16M 11/26 248/161 |
| 6,286,795 B1 * | 9/2001 | Johnson | F16M 11/16 248/163.1 |
| 6,688,566 B1 * | 2/2004 | Crain | G01C 15/00 248/168 |
| 6,942,187 B2 * | 9/2005 | Blackburn | F16M 11/32 248/163.1 |
| 7,182,303 B2 * | 2/2007 | Speggiorin | F16B 7/105 248/168 |
| 7,604,208 B2 * | 10/2009 | Tacklind | F16M 11/36 248/170 |
| 7,654,494 B2 * | 2/2010 | Cartoni | F16M 11/36 248/163.1 |
| 8,231,088 B2 * | 7/2012 | Lu | F16M 11/34 248/163.1 |
| 2002/0030146 A1 * | 3/2002 | Akaike | F16M 11/32 248/157 |
| 2003/0226941 A1 | 12/2003 | Crain et al. | |
| 2004/0004168 A1 * | 1/2004 | Crain | F16B 7/1463 248/188.8 |
| 2006/0175484 A1 * | 8/2006 | Wood, III | F16M 11/32 248/177.1 |
| 2007/0131825 A1 * | 6/2007 | Skrodzki | F16M 11/10 248/177.1 |
| 2009/0072100 A1 * | 3/2009 | Zierer | F16M 11/28 248/169 |
| 2010/0282921 A1 * | 11/2010 | Hein | F16M 11/32 248/125.8 |
| 2011/0031358 A1 * | 2/2011 | Fischer | F16M 11/36 248/168 |
| 2011/0073722 A1 * | 3/2011 | Meuret | F16M 11/34 248/169 |
| 2014/0084127 A1 * | 3/2014 | Lee | H01Q 1/273 248/544 |

FOREIGN PATENT DOCUMENTS

| | | |
|---|---|---|
| DE | 8505527 U1 | 9/1985 |
| DE | 3425374 C1 | 1/1986 |
| DE | 19622894 C1 | 8/1997 |
| GB | 2273368 A | 6/1984 |
| GB | 2509514 A | 7/2014 |

* cited by examiner

TRIPOD LEG

CROSS REFERENCE TO RELATED APPLICATIONS

This application is a national phase filing under 35 U.S.C. § 371 of International Patent Application No. PCT/GB2016/050534, filed Mar. 1, 2016, which claims priority to Great Britain Application No. 1505327.5 filed Mar. 27, 2015, both of which are incorporated herein by reference in their entirety.

FIELD OF THE INVENTION

The invention relates to a tripod leg, and in particular, to a tripod leg for a camera supporting tripod.

BACKGROUND TO THE INVENTION

It is known that a cameraman may need to adjust a camera tripod up to or over one hundred times a day. Each adjustment of the tripod requires the adjustments of at least three clamps (or more, as often there could be up to 9 clamps for adjusting a three stage tripod) which can be very arduous for the cameraman/tripod user. Therefore, it is known for a single combination clamp lever to be incorporated within a tripod leg which locks all the clamps on one leg with one single movement. The disadvantage of these types of tripod clamps is that the clamp lever is arranged on the first sliding stage of the leg and so will drop down (or shift up) when the leg is extended (or retracted), which makes it awkward for the cameraman to undertake the adjustment whilst also steadying the associated payload supported by the tripod, which can weigh anything from 10 kilos to 90 kilos in weight.

The weight of the payload means that the combined tripod and the payload have a high centre of gravity. If the clamp lever is arranged to be low, it is then difficult for the operator to adjust the tripod whilst it is supporting the payload. This can result in the tripod then becoming unstable, which is dangerous to the cameraman/tripod user given the weight of the payload.

Furthermore, it is also known for a tripod leg to incorporate a connection rod for operating a tripod leg brake, wherein the connection rod is located externally to the tripod leg and is adjacent to either the top surface, or the bottom surface, of the leg. The disadvantage of these known connection rods is that they add a significant amount of bulk to the tripod leg (particularly when the tripod is in a folded state) and are therefore prone to damage and/or being unintentionally caught by the cameraman/tripod user.

It is the purpose of this invention to overcome at least some of these problems.

SUMMARY OF THE INVENTION

In a broad independent aspect, the invention provides a tripod leg arranged to be fixed to a tripod head, the leg comprising a plurality of leg sections, slidably movable relative to each other.
clamping means to releasably prevent said movement and further comprising a lever operable wherein said lever is arranged on a portion of said leg, which lever in use, does not move in relation to an attached tripod head and is operable to actuate or release the clamping means and characterised in that said lever further comprises an aperture to enable operation of the lever by one or more digits of a user's hand.

This configuration provides the tripod user with an ergonomic grip of the lever which enables them to easily and safely manage the height adjustment of the tripod whilst supporting a heavy payload. The apertures provide the tripod user with the means of grasping the lever with a clenched fist, which provides them with a secure grip for lifting the combined weight of both the tripod and supported payload. The levers do not move in relation to the tripod head element so that when the leg is adjusted, the user's holding point remains fixed and close relative to the high centre of gravity provided by the tripod and supported payload so that they remain stable during the adjustment.

Preferably, said lever is moveable to a first position wherein said aperture is open to cooperate with one or more digits of a user's hand; and moveable to a second position wherein said aperture is closed.

This configuration enables the aperture to cooperate with the user's fingers when required, and when not required the aperture is closed to prevent any unintentional use of the lever.

Preferably, said lever is pivotally attached to said leg and thereby facilitating the pivotal movement of said lever between said first and second positions.

This configuration provides a simple attachment means which enables the lever to pivot to open the aperture when required, and pivot to close the aperture when the aperture is not required.

Preferably, said lever further comprises two arms arranged in a substantially "U" shaped configuration.

This configuration provides a lever, when attached to the leg, which has an aperture located within the arms and closed end portion of the "U" shaped lever.

Preferably, each said arm further comprises an open end which further comprises an aperture which cooperates with a protrusion extending from said leg.

This configuration provides each arm with a pivotable attachment means to the leg, whereby the aperture within the lever arm, pivots about the protrusion from the leg (i.e. a spigot, peg or the like).

Preferably, each said arm further comprises an angle wherein said open end of each said arm extends along a plane which deviates from a portion of said lever wherein said arms join to form a closed end of said lever.

This configuration provides the lever with a simple one piece construction, which is cheap and efficient to make.

Preferably, said lever is positioned at said first position, said closed end of said lever extends along a plane substantially perpendicular to said leg.

This configuration enables the closed end of the lever to extend along a substantially horizontal plane when fully extended from the leg.

Preferably, said lever is positioned at said second position, said closed end of said lever is located parallel to said leg.

This configuration enables the closed end of the lever to be located against the outer surface leg when not in use.

This configuration enables the closed end of said lever to extend along a substantially horizontal plane when in use; as well as enabling the leg to be located against the leg when not in use. This gives an obvious visual indication of whether the leg clamps are set or not set, providing additional safety for the camera operator.

Preferably, said lever operates a clamping means which is located between a first portion and a second portion of said leg; positioning of said lever to said first position activates said clamping means and position of said lever to said second position deactivates said clamping means.

This configuration enables the tripod user to adjust the length/height of the leg when the lever is positioned in the first position; and setting/locking the length/height of the leg when the lever is positioned in the second position.

Preferably, a tripod comprising a plurality of tripod legs according to any of the previous features.

This configuration provides a tripod comprising a plurality of tripod legs which comprise the above features.

Preferably, the connecting element between the lever and the clamping means is substantially located on the same plane as the width of said leg.

This configuration provides a connecting mechanism that is flush with the leg and therefore reduces the required depth of the leg required to incorporate the mechanism. The reduced depth provides a more compact leg, which reduces the bulk of the tripod a when folded.

Preferably, said connecting element is at least partially located within said leg.

This configuration protects the connecting element from any impacts, which may cause subsequently damage to the element. Furthermore, this configuration may prevent the connecting element from getting unintentionally caught on the cameraman/tripod user, which may cause an injury and/or damage to the tripod leg.

Preferably, said connecting element further comprises a plurality of connecting elements and characterised in that said connecting elements are arranged on said leg in a telescopic configuration.

This configuration enables the tripod leg to lengthened and shortened, while maintaining the mechanical connection between the lever and the clamping mean of the tripod leg.

Preferably, a first said connecting element is operably connected to said lever and said remote clamping means, and a second said connecting element is operably connected from said remote clamping means to a second remote clamping means; whereby said second remote clamping means is located between said second portion and a third portion of said leg; positioning of said lever to said first position activates said second clamping means and positioning of said lever to said second position deactivates said second clamping means.

This configuration facilitates the simultaneous clamping of the first, second and third portions of the leg via the first and second clamping means; via the operation of the lever.

Preferably, said connecting element is a torsion rod device.

This configuration communicates a rotational movement from the lever, to the first clamping means and will clamp the clamping means by a rotational movement in one direction, and unclamp the clamping means by a rotational movement in a second direction.

Preferably, a tripod further comprising a supporting element adapted to support said connecting element, whereby said supporting facilitates the operation of said connecting rod to said first remote clamping means and/or second remote clamping means.

This configuration enables the connecting rod to be supported so that it is flush with the tripod leg, while communicating the movement of the connecting element along all the interconnected portions of the tripod leg.

In addition, the lifting of the operating levers when the tripod is deployed applies a torque to the leg which encourages the swinging open of the leg and hence reduces the time required to unfold and deploy the tripod.

Preferably, the tripod leg further comprises a stop mechanism which restricts the angle to which the leg can swing and hence enables the tripod to be deployed without a spreader element.

This configuration reduces the weight of the tripod and makes it easier to deploy and fold up. The lifting of the clamp operating levers when the tripod is deployed will then naturally swing the legs to their operating position, providing even simpler and quicker deployment as the operator can swing the legs out and set their length in a single movement.

Preferably, said stop mechanism for the leg angle is adjustable, whereby in use, the initial angle of said leg at deployment can be preset.

Preferably, said stop mechanism for the leg is adjustable, whereby in use the leg angle can be adjustable.

Preferably, the adjustment of said stop mechanism is configured such that the operator can change the stop whilst they are using the clamp operating lever to support the payload and simultaneously adjusting the leg length.

This configuration is beneficial as it helps the operator manage the weight of the payload, reducing the risk of it becoming unstable. Additionally, a change in the leg angle usually requires a corresponding change in the leg length to maintain the position and stability of the payload. This configuration enables the operator to adjust the leg angle and length in a single operation.

Preferably, said stop mechanism means is operated from a button or lever which can be easily reached by one of the operator's digits whilst they are operating the clamp operating lever.

Preferably, said stop mechanism means is controlled from said lever, whereby in use, said lever is pressed/arranged beyond its first position to release the stop and letting it spring back to its first position to set the stop.

A BRIEF DESCRIPTION OF THE FIGURES

The invention is now described with respect to the accompanying drawings which show by way of example only, one embodiment of a tripod incorporating a tripod leg in accordance with the invention. In the drawings.

A DETAILED DESCRIPTION OF THE FIGURES

Figure 1:
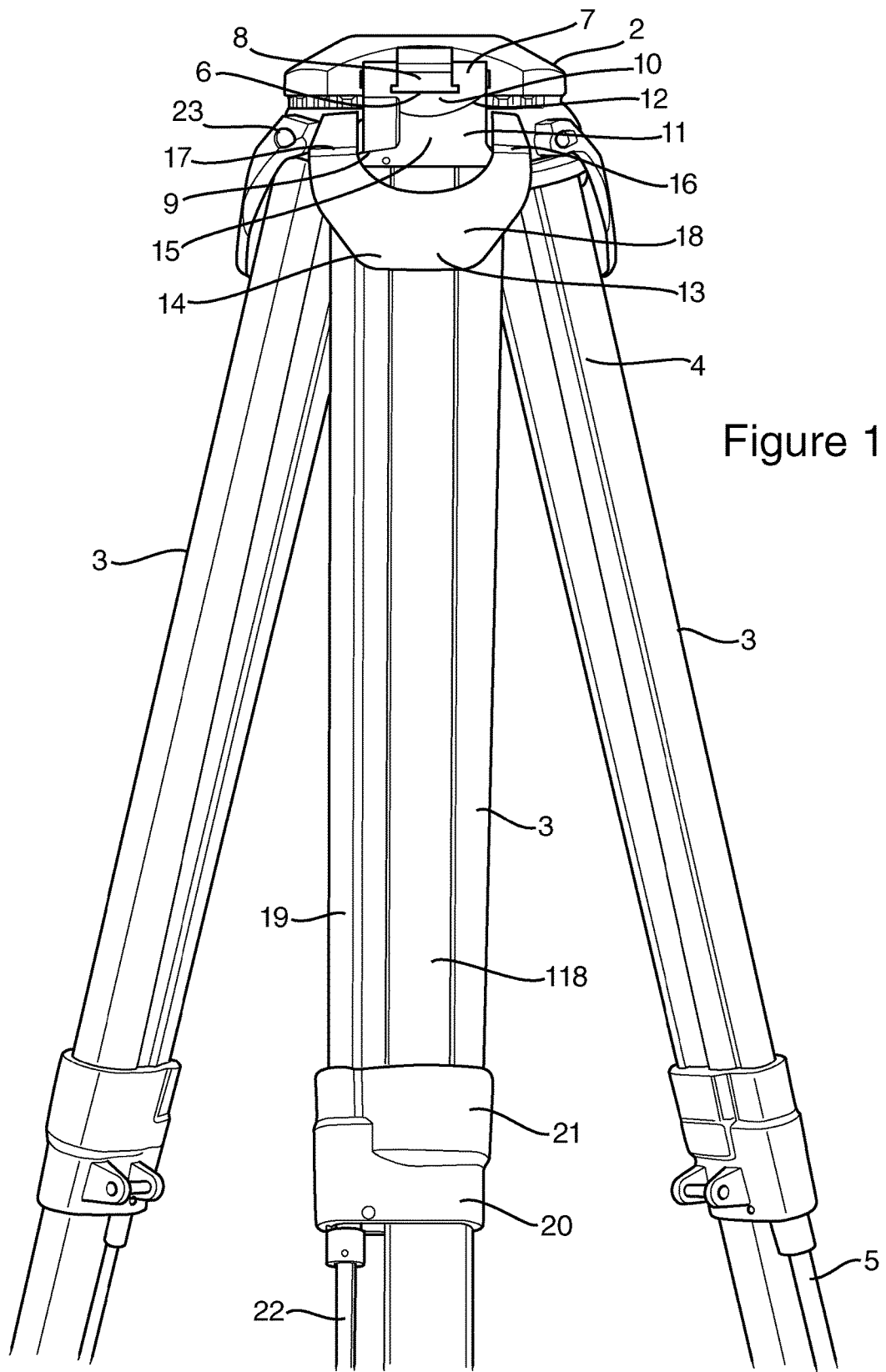
FIG. 1 shows a side perspective view of a camera tripod incorporating a tripod leg.

FIG. 1 shows a side perspective view of a camera tripod, which is generally indicated by 1. The tripod incorporates a tripod head 2, located at the top of the tripod and has three tripod legs 3, each pivotally attached to the head 2. Each tripod leg 3 incorporates a top segment/portion 4 and a middle segment/portion 5. The top portion 4 of the leg 3 is pivotally attached to the tripod head 2 via its top end 6 and is telescopically attached to the middle segment/portion 5.

The pivotable attachment of the top end 6 incorporates two arms 7 and a button 8 located between the two arms 7. The tripod head 2 provides a shaped recess which fits and cooperates with shaped elements of the button 8 to provide a leg angle adjustment means. Operating the button to two or more set positions provides different limit stops to the angle of the leg relative to the head.

Below the left arm 7 of the pivotable attachment, a cylindrical element 9 is located within the top end 6 of the top segment/portion 4. Within the cylindrical element 9 is a transmission means, such as a mechanical drive means, which communicates the rotational movement of the lever 13 about a horizontal axis, to a connecting element 19 arranged along a vertical axis.

The top end 6 of the top segment/portion 4 incorporates an upper surface area 10 and a lower surface area 11. The upper surface area 10 is separated from the lower surface area via a concave line 12 which extends along a horizontal plane on the top end 6 of the top segment/portion 4.

The leg 3 further comprises a substantially "U" shaped lever 13 which incorporates a closed end 14 and an aperture 15 which is located between two lever arms 16. The two lever arms 16 are pivotally mounted onto the side portions of the top end 6 of the top segment/portion 4. Each lever arm 16 further comprises an angle A wherein the open end of each arm extends along a plane which deviates from a portion of the lever 13 wherein the arms 16 join to form a closed end of the lever 13. The angle A within the each lever arm 16 is in the region of 25 to 145 degrees.

The lever 13 incorporates an upper surface area 17 and a lower surface 18. The upper surface area 17 is separated from the lower surface 18 via an arced line which extends along a horizontal plane on each arm 16. Each arm 16 incorporates an aperture 23, which cooperates with a spigot protrusion which protrudes from the top end 6 of the leg 3. The cooperation of the aperture 23 with the spigot/protrusion enables the attached lever to rotate about the spigot/protrusion, thereby providing the pivotal attachment of the lever 13 to the top segment/portion of the leg 4, and a means to transmit the movement of the lever 13 to a transmission means of the cylindrical element 9 within the leg which translates the movement of the lever 13 to a movement of the connecting element 19.

The closed end 14 of the lever 13 incorporates a width that is greater than the width of each of the arms 16, which provides the lever 13 with an increased mechanical strength. When the lever is extended, i.e. when the lever 13 is pivoted away from the leg 3, the tripod user [e.g. a camera man] will be able to locate one or more of their digits through the aperture 15 and thereby grasp the lever 13.

The closed end of the lever incorporates a flat outside edge which cooperates with the palm hand of the tripod user when grasped.

The top segment/portion 4 of the leg 3 further comprises a linear centre portion 118 which extends centrally along the length of the top segment/portion 4 of the leg 3.

Each leg 3 is of a leg width that extends horizontally with said width being greater than the leg depth. Furthermore, each leg 3 is substantially elliptical in a cross-sectional area.

The connecting element 19 provides a mechanical connection from the lever 13, to the first leg clamping means 20 [e.g. a braking means], which is located between the top segment/portion 4 of the leg 3 and the middle segment/portion 5 of the leg. In the exemplified embodiment the connection element 19 is located adjacent to the left hand side of the leg and is located in a plane, which extends along the width of the top segment/portion 4 of the leg 3. The connecting element 19 is shown to be enclosed within the body of the top segment/portion of the leg 4 and extends along the length of the top/segment/portion of the leg 4. The connection element 19 is typically a connection rod.

Both the top segment/portion 4 of the leg 3 and the enclosed connecting element 19 extend into a housing 21. The housing 21 encloses the leg clamping means 20 for controlling the movement of the middle segment/portion 5 of the leg 3, relative to the top segment/portion 4 of the leg 3. Furthermore, each leg 3 is substantially elliptical in a cross 6 sectional area [i.e. both the left and right side walls incorporate a curvature].

The middle segment/portion 5 of the leg 3 extends linearly from the bottom surface of the housing 21. The housing 21 encloses a mechanical connection between the connecting element 19 and a second connecting element 22, which is located adjacent to the left hand side of the housing 21. The second connecting element is located in a plane which extends along the width of the middle segment/portion 5 of the leg 3. The second connecting element 22 extends linearly along the length of the middle segment/portion 5 of the leg 3 and is not enclosed within the body of the middle segment/portion 5 of the leg 3; therefore second connecting element 22 is exposed.

The mechanical connection between elements 19 and 22 allows the connecting element 22 to slide into the connecting element 19 as the middle segment/portion 5 retracts into the top stage 3.

The bodies of the top segment/portion 4 and middle segment/portion 5 of the leg 3 and housing 21 are formed from a carbon fibre material.

Figure 2:
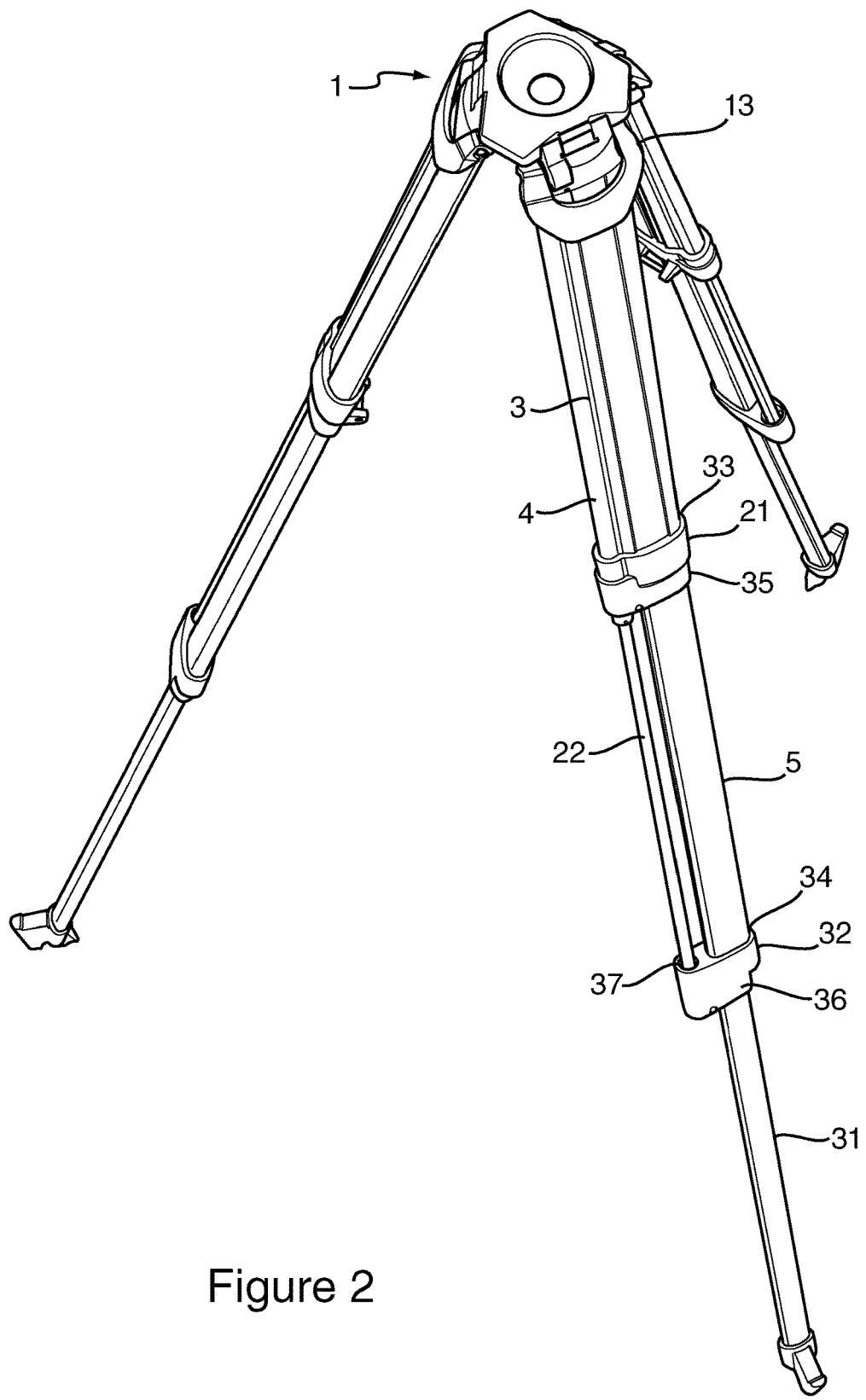
FIG. 2 shows an upper perspective view of a tripod incorporating a tripod leg.

FIG. 2 shows an upper perspective view of the tripod 1 shown in FIG. 1. Again each leg 3 of the tripod incorporates a top segment/portion 4, a middle segment/portion 5 and a bottom segment/portion 31. The three leg segments/portions 4, 5, 31 are arranged so that the overall length of the leg 3 can be telescopically adjusted so that the desired leg length can be achieved.

Between the top segment/portion 4 and the middle segment/portion 5 of the leg 3, is the first housing 21 of the leg. Between the middle segment/portion 5 and the bottom segment/portion 31 of the leg 3 is a second housing 32 of the leg.

The first housing 21 incorporates a recess 33, which facilitates insertion of the top segment/portion 4 of the leg 3. Below the recess 33 is an elliptical body portion 35, from which the middle segment/portion 5 and the second connecting element 22 extend. Again the second connecting element 22 is exposed and arranged on the left side of the middle segment/portion 5 of the leg 3.

The second housing 32 incorporates a first recess 34, which facilitates insertion with the insertion of the middle segment/portion 5 of the leg 3, and a second recess 37 which cooperates with the insertion of the second connecting element 22. Below the first and second recesses 34 and 37 is an elliptical body portion 36, from which the bottom leg segment/portion 31 extends.

The first housing 21 encloses a first clamping mechanism for locking and releasing the middle segment/portion 5 of the leg 3 relative to the top segment/portion 4 of the leg 3. The second housing 32 encloses a second clamping mechanism for locking and releasing the bottom segment/portion 31 of the leg 3 relative to the middle segment/portion 5 of the leg 3. Both the first housing 21 and second housing 32 are located remote to the lever 13.

The lever 13 of the leg 3 is arranged such that it is in a closed state when lying against the outer surface of the top segment/portion 4 of the leg 5. The aperture 15 of the lever 13 is then so located that the tripod user cannot insert their finger[s]/digit[s]. When the lever 30 is in the closed position, it is also in more compact state, which in use, is difficult to be unintentionally opened.

Figure 3:
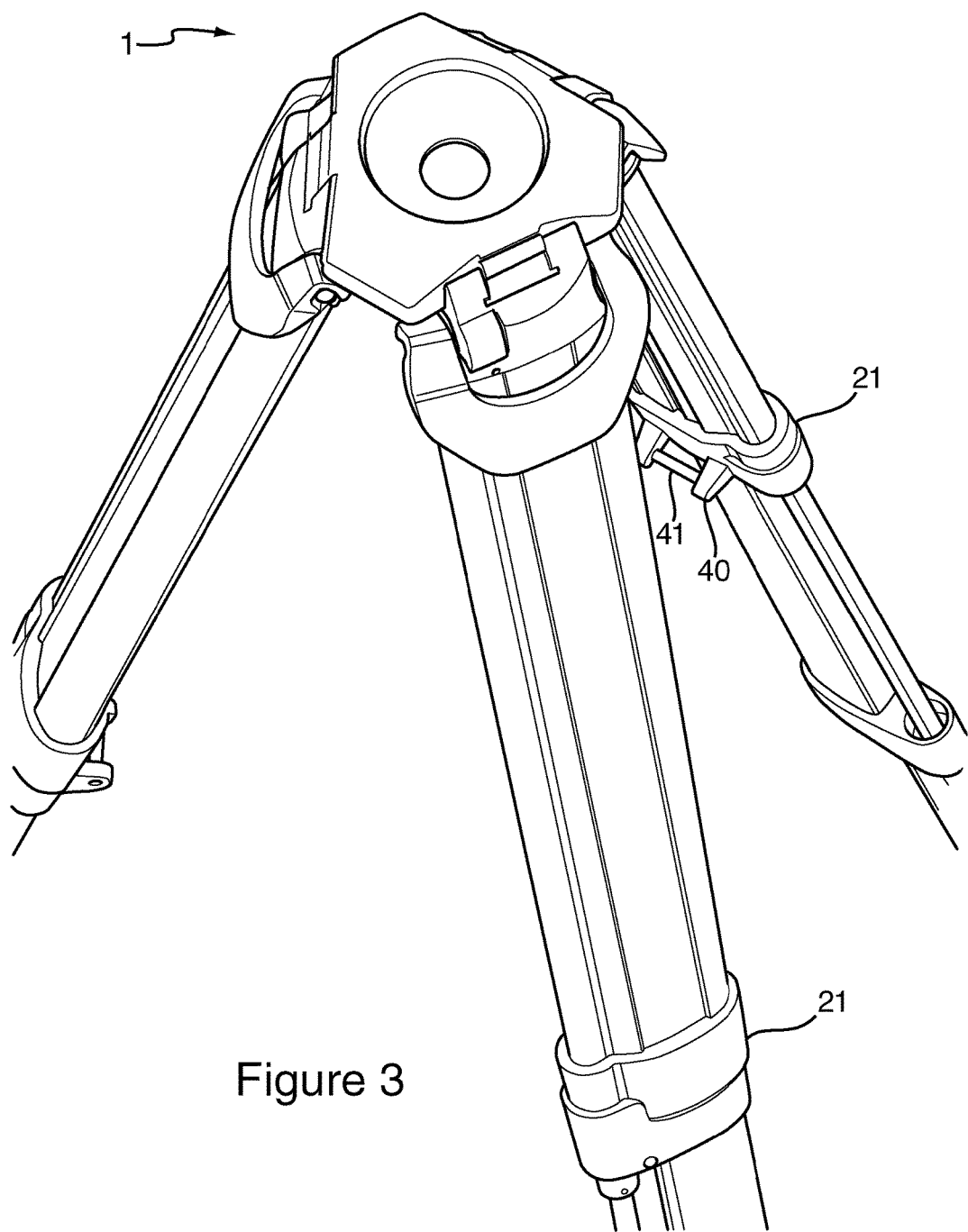
FIG. 3 shows a close-up upper perspective view of a camera tripod incorporating a tripod leg.

FIG. 3 shows a close up upper perspective view of the tripod 1 shown in both FIGS. 1 and 2. The first housing 21 incorporates an elongate element 41, which is horizontally arranged between two supporting pillars 40. Both supporting pillars 40 extend from the inner surface of the first housing 21. This construction provides a connecting means for an optional mid-level spreader attachment.

In use, the lever 13 is pivotally attached to the top segment/portion of the leg, which is closest to the tripod head. When the leg is extended, the lever does not move in relation to the tripod head. However the middle and lower segments/portions of the leg move relative to the tripod head and lever. The "U" shaped configuration of the lever facilitates the tripod user's grasp of the lever by one hand, whereby the tripod user can insert one or more fingers through the open central aperture of the lever, when the lever is pivotally extended away from the leg. The open aperture within the pivotally extended lever enables the tripod user to use the ever to lift the tripod and the attached tripod payload to adjust the overall length of the tripod leg. The pivotal movement of the lever a simultaneously releases the first remote clamping mechanism located between top segment/portion and middle segment/portion of the leg and also the second remote clamping mechanism located between the middle segment/portion of the leg and the bottom segment/portion of the leg.

When the required length of leg has been achieved, the tripod user then closes the aperture within the lever by pivotally adjusting the position of the lever so that the lever is located against the outer surface of the leg. When the lever is located in this closed position, the first and second clamping mechanisms are then activated and therefore lock together all the segments/portions of the leg.

The lever is remote from both clamping mechanisms of the leg and does not form an integral part of either of the clamping mechanisms for the leg. The lever is mechanically connected to the clamping mechanisms of the leg via one or more connecting elements. The connecting elements may be one or more torsion rods configuration, which in use, communicate a rotational movement from the lever, to a clamping mechanism which then subsequently releases or locks the clamping mechanism.

The activation of the lever provides the camera leg with a fast adjustable mechanism which substantially reduces the number of operations required to adjust the required length of the leg. Placement of the clamp lever at the topmost portion of the leg, where it does not move in relation to the head, allows the payload to be lifted whilst still attached to the tripod. A user, such as a cameraman, can therefore adjust the tripod and also lift and keep the tripod head and payload stable during adjustment of the tripod using the lever. In other words, the clamp adjustment levers are also used as handles for lifting and lowering the tripod payload. Apart from the pivoting action during opening and closure, the clamp lever does not move in relation to the tripod head and the tripod payload is therefore more stable as the legs are being extended or retracted in relation to the tripod head. The location of the lever provides an attached tripod payload with a constant relationship between the lever, where the user's hands are, and the centre of gravity, which enables a more stable adjustment of the tripod leg that is less dangerous to the user.

This is important, because the payload mounted upon the tripod can be anything from 10 to 90 Kilograms in weight, and the combined weight of the tripod and payload at the top of the tripod will result in a high centre of gravity. Therefore, were the clamp lever located at a lower position, then adjustment of the payload by the tripod user would become more difficult without the tripod becoming unstable, which would be dangerous given the weight of the payload.

The clamp levers are ergonomically designed so that the tripod user can use them to lift the payload during the height adjustment of the tripod. This makes the adjustment simpler and more fluid for the tripod user.

When three legs, as exemplified herein, are incorporated within a tripod, the three clamp levers are situated close together at the top of the tripod, which is easier for the tripod user to use with both hands, such that all the levers can be simultaneously operated by the tripod user with two hands to lift/lower the payload. The levers can also be individually operated to level the tripod when required.

The torque applied by the operator to open the clamp levers when deploying the tripod will naturally encourage the opening of the tripod legs from their stowed position, thus speeding up and easing the deployment of the tripod. The legs will naturally swing open to a point at which they are constrained by a leg angle adjustment mechanism such as a spreader element.

Use of a leg angle adjustment mechanism that communicates between the tripod head and tripod leg improves the speed and ease of deployment of the tripod relative to the use of a spreader mechanism, and reduces the tripod weight.

Siting such a leg angle adjustment mechanism next to the clamp lever on each leg enables the operator to adjust the angle of the leg whilst supporting the payload using the clamp lever. Positioning the leg adjustment mechanism such that it can be easily operated whilst the operator is simultaneously operating the clamp lever enables the operator to adjust the leg angle and leg length in a single movement, whilst also maintaining the stability of the payload.

The connecting elements of the brakes between the remote lever and the clamping mechanism incorporated within the leg are located adjacent one side of the tripod leg, such as the left side of the leg. When a connecting rod is located in this position, the connecting rod reduces the depth of the tripod leg and therefore ostensibly the bulk of the leg. This is particularly relevant to when the tripod is in a folded state and therefore prevents damage or any unintentional catching from the operator. The reduced leg depth is provided by the connecting element being flush to the tripod leg and beings mounted coplanar with the horizontal plane of the width of the leg.

The connecting element is enclosed within the top segment/portion of the leg, which prevents any jamming or deterioration of the leg components of the leg.

The connecting rod is exposed within the middle segment/portion of the leg, which enables the leg enclosure to require the minimum body components and therefore reduces its complexity to manufacture and weight.

In summary, the advantages of this improved tripod leg are:
  the complete leg is ergonomic and when closed provides no protrusion or open components within the leg. The connecting rods extend down the side of the legs between the upper and lower clamps;
  the handles at the top of the legs, which always remain at the top and which flip up to unlock and flip down to lock the leg brake element(s). This gives the ergonomic and safety advantages of more easily managing the height adjustment with a heavy payload attached to the tripod head;
  the three handles being located close together also gives the benefit of being able to lock or unlock all the legs in a single movement (using both hands) to adjust the height of the tripod, whilst being able to lock/unlock just a single leg to adjust for levelling the tripod;

the flush legs whereby the connecting rods are mounted to the sides of the leg components are fully enclosed within the operating mechanisms of the leg, at least for the top stage, with no protruding mechanisms. This provides ergonomic and safety advantages for the leg. The flush legs work with the ergonomic designs of the handles to make the opening and closing of the clamp levers easy with no chance of finger traps;

the shape of the handles enables the operator to grip the handles securely with the operator's r fingers passing through the handle to provide ergonomic and safety advantages; and the siting of the handles next to the leg angle adjustment levers enables the operator to quickly deploy the tripod and to simultaneously adjust the angle and length of each of the legs.

The invention claimed is:

1. A telescopic tripod leg, comprising:
   a plurality of leg sections comprising a first section arranged to be directly fixed to a tripod head element, a second section that is slidably movable relative to the first section, and a third section that is slidably movable relative to the second section;
   clamping means to releasably prevent movement of the plurality of leg sections relative to each other, the clamping means comprising a clamp operating lever;
   wherein said clamp operating lever is arranged on the first section of said tripod leg, wherein when the clamp operating lever is in use, the clamp operating lever is stationary in relation to the tripod head element when the second section is being slid relative to the first section; and is operable to actuate or release the clamping means, wherein said clamp operating lever further comprises an aperture to enable operation of the clamp operating lever by one or more digits of a user's hand.

2. The tripod leg according to claim 1, wherein said clamp operating lever is moveable to a first position wherein said aperture is open to cooperate with the one or more digits of the user's hand; and moveable to a second position wherein said aperture is closed.

3. The tripod leg according to claim 2, wherein said clamp operating lever is pivotally attached to said tripod leg and thereby facilitating a pivotal movement of said clamp operating lever between said first position and said second position.

4. The tripod leg according to claim 1, wherein said clamp operating lever further comprises two arms arranged in a substantially "U" shaped configuration, wherein each arm further comprises an open end which further comprises an arm aperture which cooperates with a protrusion extending from said tripod leg.

5. The tripod leg according to claim 2, wherein when said clamp operating lever is positioned at said first position, a closed end of said clamp operating lever extends along a plane substantially perpendicular to said tripod leg, and wherein when said clamp operating lever is positioned at said second position, said closed end of said clamp operating lever is located parallel to said tripod leg.

6. The tripod leg according to claim 1, wherein said clamp operating lever is operably connected to a remote clamping means via a connecting element; whereby said remote clamping means is located between a first portion and a second portion of said tripod leg; positioning of said clamp operating lever to a first position activates said clamping means and position of said clamp operating lever to a second position deactivates said clamping means.

7. The tripod leg according to claim 6, wherein said connecting element is substantially located on the same plane as a width of said tripod leg or wherein said connecting element is at least partially located within said tripod leg.

8. The tripod leg according to claim 6, wherein said connecting element further comprises a plurality of connecting elements, wherein said plurality of connecting elements are arranged on said tripod leg in a telescopic configuration, wherein a first connecting element is operably connected to said clamp operating lever and said remote clamping means, and a second said connecting element is operably connected from said remote clamping means to a second remote clamping means; whereby said second remote clamping means is located between said second portion and a third portion of said tripod leg; positioning of said clamp operating lever to said first position activates a second clamping means and positioning of said clamp operating lever to said second position deactivates said second clamping means.

\* \* \* \* \*